(12) United States Patent
Kaneko

(10) Patent No.: US 7,796,595 B2
(45) Date of Patent: Sep. 14, 2010

(54) PACKET GENERATION METHOD, COMMUNICATION METHOD, PACKET PROCESSING METHOD AND DATA STRUCTURE

(75) Inventor: Yohei Kaneko, Kyoto (JP)

(73) Assignee: Panasonic Corporation, Osaka (JP)

( * ) Notice: Subject to any disclaimer, the term of this patent is extended or adjusted under 35 U.S.C. 154(b) by 1031 days.

(21) Appl. No.: 11/130,095

(22) Filed: May 17, 2005

(65) Prior Publication Data

US 2005/0271056 A1 Dec. 8, 2005

(30) Foreign Application Priority Data

May 17, 2004 (JP) .................. P2004-146013

(51) Int. Cl.
*H04L 12/28* (2006.01)
*H04L 12/16* (2006.01)

(52) U.S. Cl. .................. 370/390; 370/392; 370/474

(58) Field of Classification Search ............... 370/389, 370/390, 392, 470, 474, 477
See application file for complete search history.

(56) References Cited

U.S. PATENT DOCUMENTS

| | | | |
|---|---|---|---|
| 6,249,820 B1 | 6/2001 | Dobbins et al. | |
| 6,754,211 B1* | 6/2004 | Brown | 370/389 |
| 6,765,866 B1* | 7/2004 | Wyatt | 370/229 |
| 7,221,660 B1* | 5/2007 | Simonson et al. | 370/312 |
| 7,248,582 B2* | 7/2007 | Belgaied et al. | 370/392 |
| 7,430,204 B2* | 9/2008 | See | 370/392 |
| 2002/0181478 A1* | 12/2002 | Shizume | 370/401 |
| 2003/0081592 A1 | 5/2003 | Krishnarajah et al. | |
| 2003/0156582 A1* | 8/2003 | Belgaied et al. | 370/389 |
| 2003/0165140 A1 | 9/2003 | Tang et al. | |
| 2003/0195973 A1 | 10/2003 | Savarda | |
| 2004/0062267 A1* | 4/2004 | Minami et al. | 370/463 |
| 2004/0093423 A1* | 5/2004 | Kaniyur et al. | 709/232 |
| 2004/0114554 A1* | 6/2004 | Okajima et al. | 370/329 |
| 2005/0025185 A1* | 2/2005 | Brown et al. | 370/474 |
| 2005/0213603 A1* | 9/2005 | Karighattam et al. | 370/463 |
| 2005/0256972 A1* | 11/2005 | Cochran et al. | 709/245 |
| 2006/0039374 A1* | 2/2006 | Belz et al. | 370/389 |

(Continued)

FOREIGN PATENT DOCUMENTS

CN 1416239 A 5/2003

(Continued)

OTHER PUBLICATIONS

Chinese Office Action, with English translation, issued in Chinese Patent Application No. CN 200510072717.8, mailed Dec. 12, 2008.

(Continued)

*Primary Examiner*—Chi H Pham
*Assistant Examiner*—Ahmed Elallam
(74) *Attorney, Agent, or Firm*—McDermott Will & Emery LLP

(57) ABSTRACT

The objective of the present invention is to perform network grouping without employing a VLAN switch.

Communication is performed by using the data structure for an IP packet that includes an IP data portion and an IP header that has an option area, for which a group number area for defining a group, consisting of a plurality of communication apparatuses, is provided as an arbitrary data area following an option end position indicator area.

7 Claims, 12 Drawing Sheets

U.S. PATENT DOCUMENTS

2008/0165773 A1* 7/2008 Kobayashi ................ 370/390
2009/0028155 A1* 1/2009 Chen et al. ................ 370/392

FOREIGN PATENT DOCUMENTS

| JP | 2000-134207 A | 5/2000 |
| JP | 2000-183968 | 6/2000 |
| WO | WO 03/088616 A1 | 10/2003 |

OTHER PUBLICATIONS

Japanese Office Action, with English translation, issued in Japanese Patent Application No. 2004-146013, mailed Jul. 7, 2009.

* cited by examiner

USE VLAN SWITCH TO MANAGE AND GROUP CONNECTION PORTS FOR PACKET DISTRIBUTION

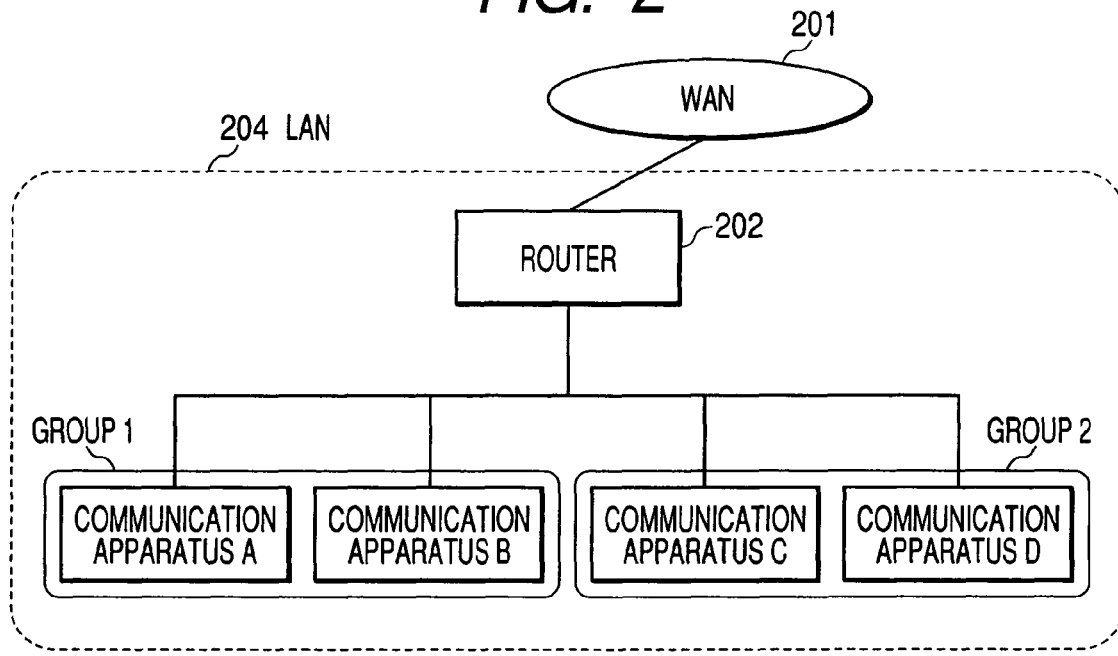
EACH COMMUNICATION APPARATUS IDENTIFIES GROUP IT BELONGS TO AND PERFORMS COMMUNICATION
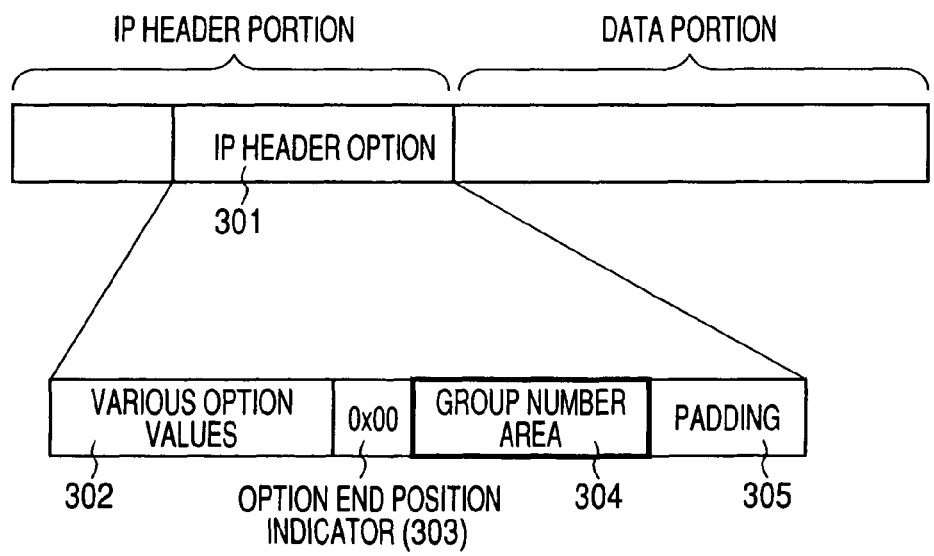

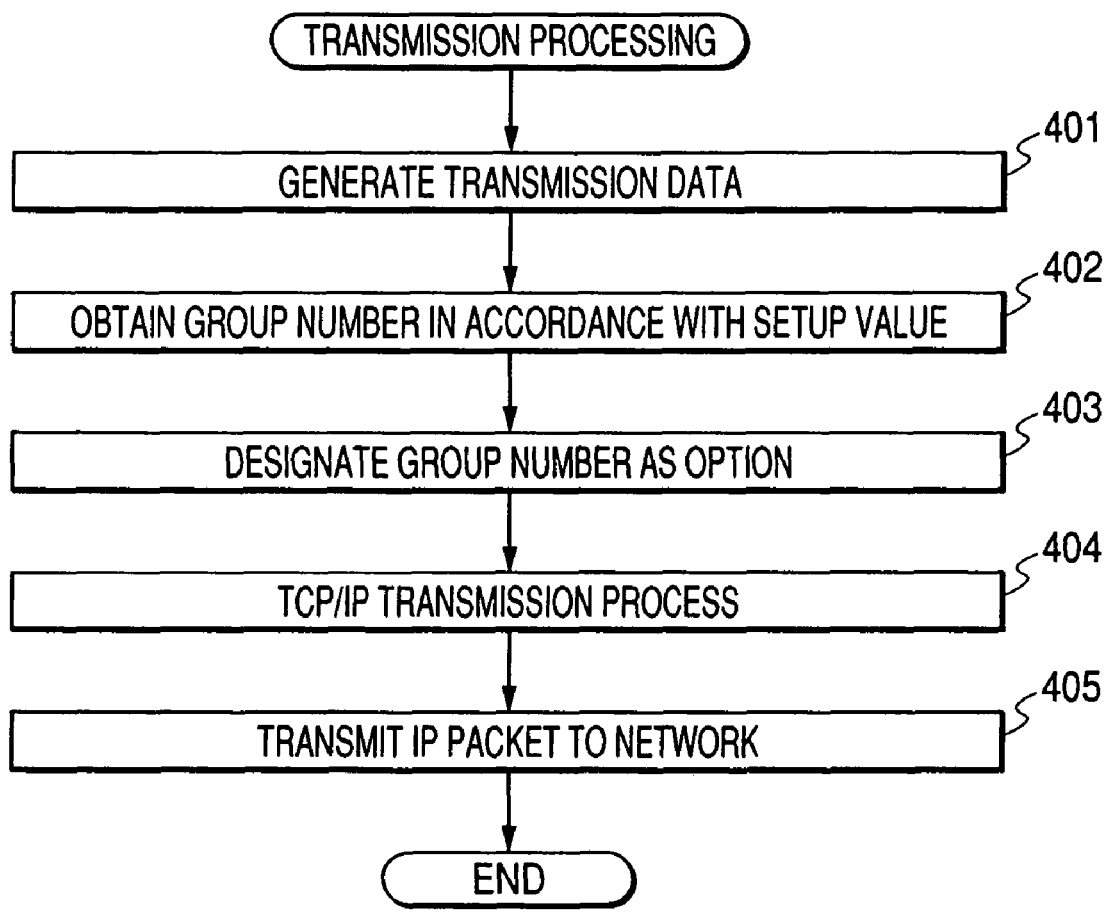

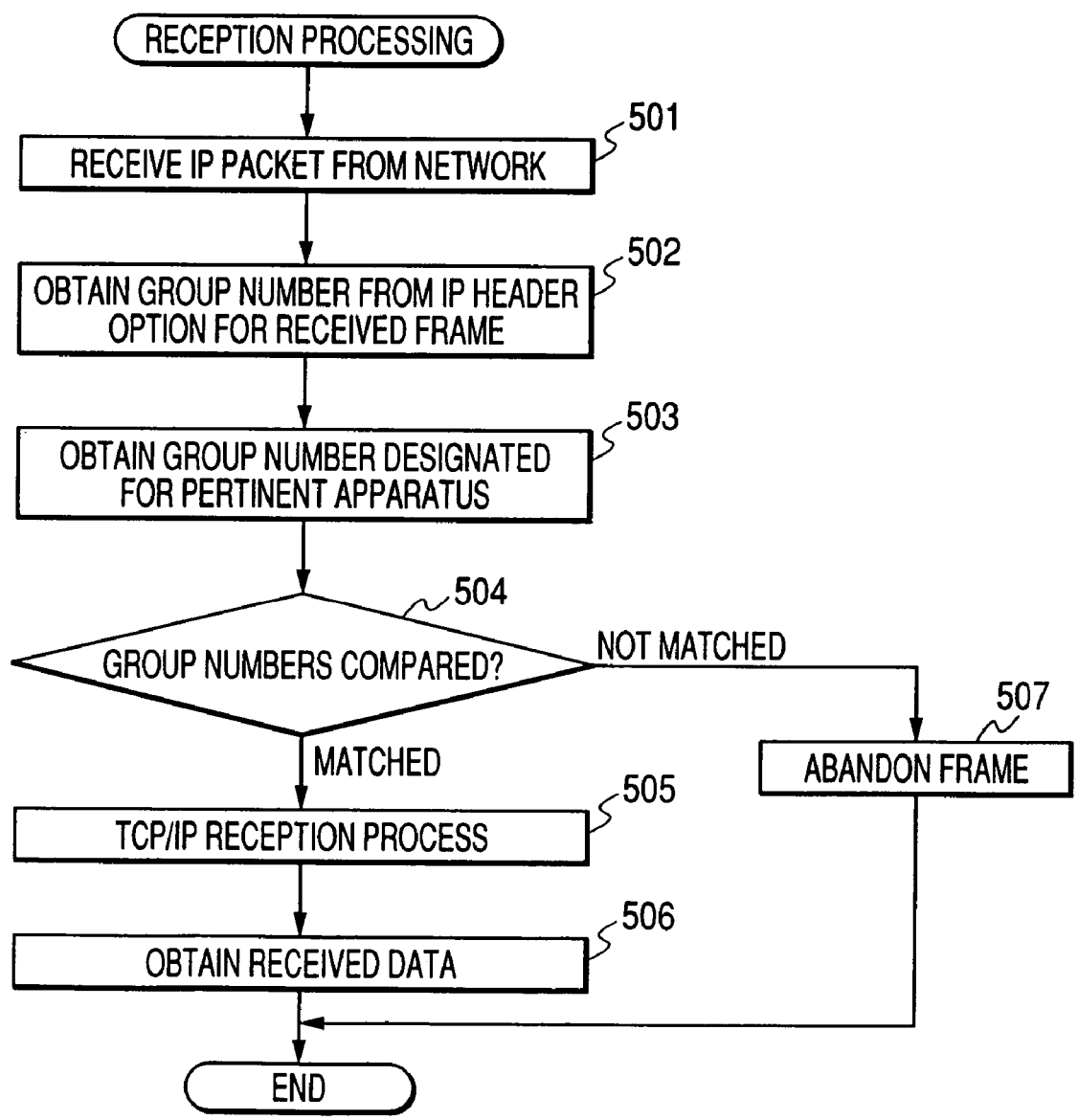

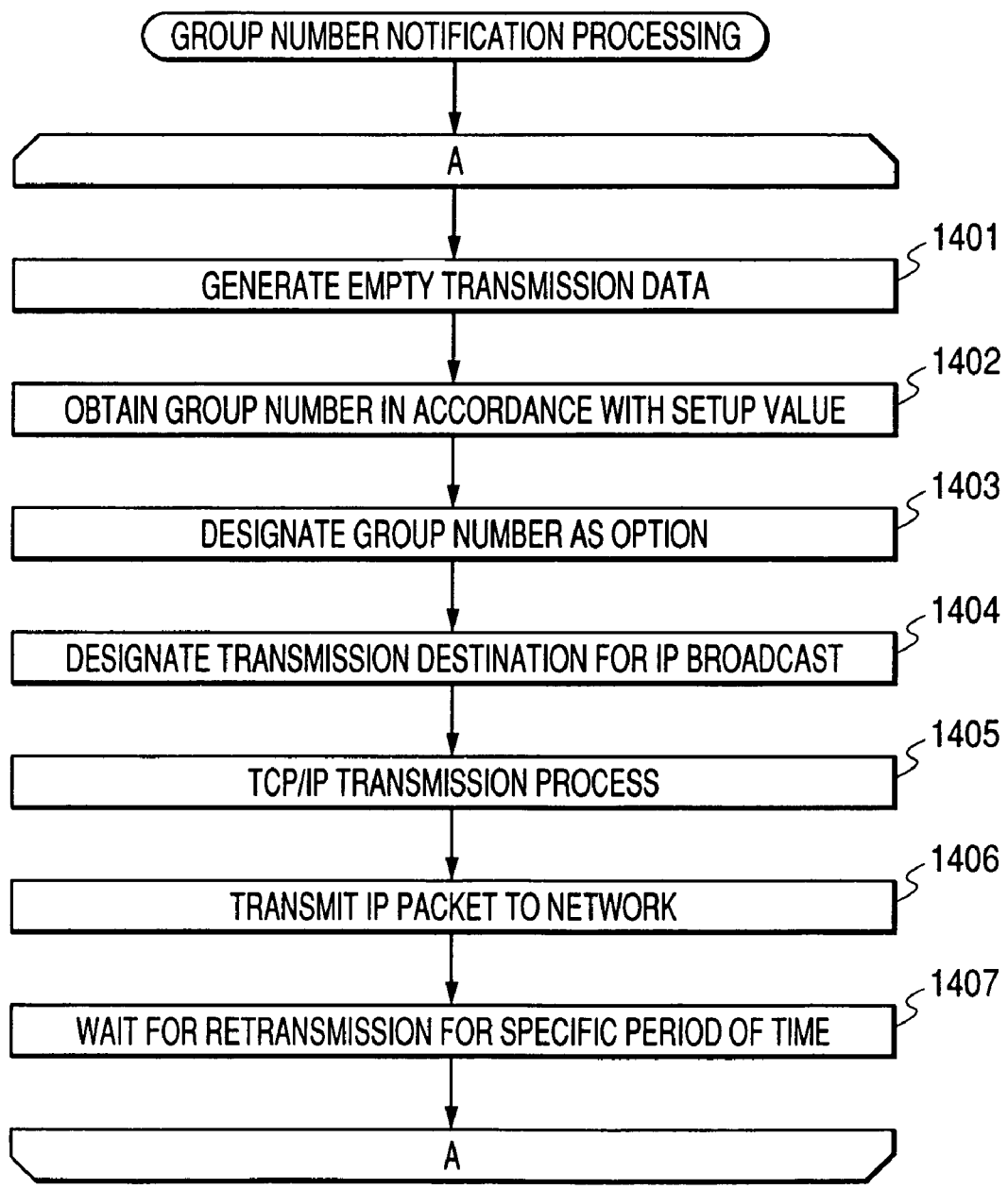

PACKET GENERATION METHOD, COMMUNICATION METHOD, PACKET PROCESSING METHOD AND DATA STRUCTURE

BACKGROUND OF THE INVENTION

1. Field of the Invention

The present invention relates to a packet generation method whereby grouping for a network can be performed, and a communication method, a packet processing method and a data structure therefor.

2. Description of the Related Art

Conventionally, a method for introducing a VLAN switch is employed for IP network grouping. In FIG. 1 is shown a network constructed using a VLAN switch 103. A communication apparatus A and a communication apparatus B belong to the same group 1, and a communication apparatus C and a communication apparatus D belong to the same group 2. In this case, the VLAN switch 103 analyzes an IP packet that is transmitted via the network and distributes the IP packet in accordance with a rule designated in advance for the VLAN switch 103. As a result, of the various communication apparatuses connected to a LAN 104, for example, communication apparatuses for which communication with each other is not desired are arranged in different groups, so that network management can be enabled (see, for example, JP-A-2000-134207 (page 10, FIG. 10)).

However, when the VLAN switch 103 is introduced, as in the above case, all the communication apparatuses connected to the network must be examined, and consideration given to the use of physical wiring to connect each communication apparatus to each port of the VLAN switch 103. Furthermore, when a group to which a communication apparatus belongs is to be changed, consideration must also be given to changing the setup of the VLAN switch 103 relative to the overall network, as well as changing the wiring, and for the maintenance work that this involves, a great deal of labor is required.

SUMMARY OF THE INVENTION

The objective of the present invention is to provide an IP packet generation method for performing network grouping without a VLAN switch being required, and a communication method, a packet processing method and a data structure therefor.

According to the present invention, provided is a generation method for forming an IP packet using an IP header, wherein included is an option area to which an arbitrary data area is added following an end position indicator representing the end of the option area, and an IP data portion. Further, according to a communication method of this invention, an IP packet, generated using the packet generation method of this invention, is transmitted Furthermore, according to the invention, provided is a data structure for an IP packet formed using an IP header having an option area, which includes an arbitrary data area that follows an option end position indicator, and an IP data portion. According to this arrangement, by employing an IP packet that is generated by adding an arbitrary data area, following an indicator for the end position of the IP header option, a group number, for defining a plurality of communication partners to be combined, can be provided in the data area, and the network grouping can be performed without a VLAN switch being required.

According to the invention, by employing an IP packet that is generated by adding an arbitrary data area following an indicator for the end position of the IP header option, a group number for defining a plurality of communication partners to be combined can be provided in the data area, and the network grouping can be performed without a VLAN switch being required.

Further, to change the group number of a group to which a communication apparatus belongs, only the setup of the group number must be changed, and unlike in a case wherein the VLAN switch is employed, a change in the setup related to the overall network and a change in the wiring arrangement are not required. In addition, since the group numbers are managed by the individual communication apparatuses, the simultaneous transmission of an IP packet can be performed for all the communication apparatuses that belong the same group. Moreover, a control command can be additionally included in the IP packet, so that remote control can be employed to control a designated communication apparatus. Further, when the simultaneous transmission function and the remote control function are employed together, a control command can be simultaneously issued to all communication apparatuses belonging to the same group, and for the network, can be increased, e.g., when communication apparatuses are separated to provide a home appliance group and an AV apparatus group for a home network, only the apparatuses in the AV apparatus group can be reset. Furthermore, when group information for a communication packet is held, communication apparatuses belonging to the same group on the network can be identified, and when a communication apparatus that is activated transmits to the network the group to which it belongs, the group information can be updated immediately. For a home network, generally, in the DHCP environment, an IP address is automatically allocated. While a VLAN switch can not cope with an environment wherein a change in an IP address is required each time an allocation occurs, the method of the invention can enable network grouping in the DHCP environment. Therefore, for network grouping in a conventional home network environment, not only are the effects obtained greater than when the VLAN switch is employed, but in addition, a network control function can be provided.

BRIEF DESCRIPTION OF THE DRAWINFGS

FIG. 2 is a diagram showing a network constructed according to the present invention.

FIG. 3 is a diagram showing the format used for an IP packet according to a first embodiment of the invention.

FIG. 4 is a flowchart showing the transmission processing for the first embodiment.

FIG. 5 is a flowchart showing the reception processing for the first embodiment.

FIG. 14 is a flowchart showing the transmission processing for an eighth embodiment of the invention.

DESCRIPTION OF THE PREFERRED EMBODIMENTS

Figure 1:
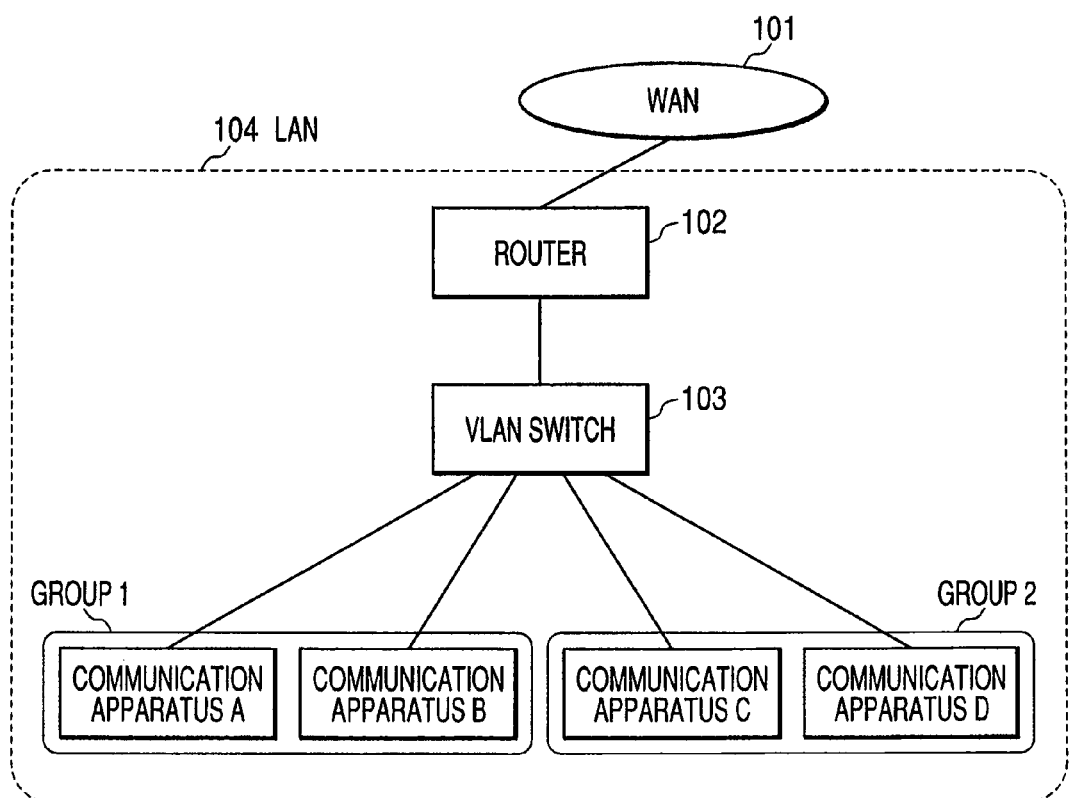
FIG. 1 is a diagram showing a network constructed using a VLAN switch.

The embodiments of the present invention will now be described. FIG. 2 is a diagram showing a network constructed in accordance with the invention. A communication apparatus A and a communication apparatus B belong to the same group 1, while a communication apparatus C and a communication apparatus D belong to the same group 2, and the communication apparatuses A, B, C and D perform a packet generation process and a packet communication process in accordance with the invention, and handle packets that are received.

FIG. 3 is a diagram showing the format of an IP packet, used for transmission and reception, that includes a group number area 304 for storing a group number. To store the group number, the size of an area used for storage must be determined in advance. When the area size is four bytes, for example, and group number 5 is to be stored, "0x00000005" is stored in the group number area 304.

A value to be set as an option is defined in an IP header option 301. When an arbitrary value is simply stored in the IP header option 301, a communication apparatus that has received this packet will perform an erroneous operation. Therefore, an option description method is designated in the IP header option 301, and after various option values 302 have been stored, an indicator value 303 (an option type value of 0x00 having a length of one byte) is stored that represents the end position of the description in the option area. That is, even when a value is stored following the value representing the end position, this value is not referred to. By using this property, when an arbitrary value is stored following the value that represents the end position and such a packet is transmitted, information can be additionally provided without adversely affecting an already existing communication apparatus. Further, since the IP header option 301 is defined as a four byte unit, for an IP header option having a length other than four bytes, a padding 305 is inserted to adjust the length.

FIG. 4 is a flowchart showing the transmission processing performed by each communication apparatus in accordance with a first embodiment of the present invention. The transmission processing will now be described while referring to FIG. 4. First, a communication apparatus generates data to be transmitted to a network (step 401). Then, the communication apparatus obtains its own group number in accordance with the setup value for the communication apparatus that has been stored in advance in an external memory or in an internal memory (step 402).

The communication apparatus designates the group number to be stored following the option end position indicator value "0x00" in the IP header option (step 403). Thereafter, the communication apparatus performs the TCP/IP transmission process to generate, as a network packet, an IP packet (step 404), and transmits the IP packet to the network (step 405). The processing is thereafter terminated.

FIG. 5 is a flowchart showing the reception processing performed by each communication apparatus in accordance with the first embodiment. The reception processing will now be described while referring to FIG. 5. First, a communication apparatus receives an IP packet from the network (step 501). Then, the communication apparatus examines the IP header option for the received IP packet, and obtains the group number stored following the option end position indicator value "0x00" (step 502).

Following this, the communication apparatus obtains its own group number in accordance with the setup value for the communication apparatus that has been stored in advance in the external memory or in the internal memory (step 503). Then, the communication apparatus compares the two group numbers (step 504), and when the two group numbers match, performs the TCP/IP reception process (step 505) and obtains data that has been received (step 506). The reception processing is thereafter terminated. Whereas when the two group numbers do not match, the communication apparatus abandons the frame that has been received (step 507), and the processing is terminated.

With this arrangement, only communication apparatuses belonging to the same group perform network communication, and these apparatuses do not perform network communication with apparatuses belonging to a different group. Thus, communication apparatuses that it is desired not to communicate with each other can be separated into different groups.

A second embodiment of the present invention will now be described while referring to FIG. 6. In the second embodiment, the packet transmission processing and the packet format to be employed are the same as those in the first embodiment; however, the reception processing that is performed to provide a function differs from that in the first embodiment.

Figure 6:
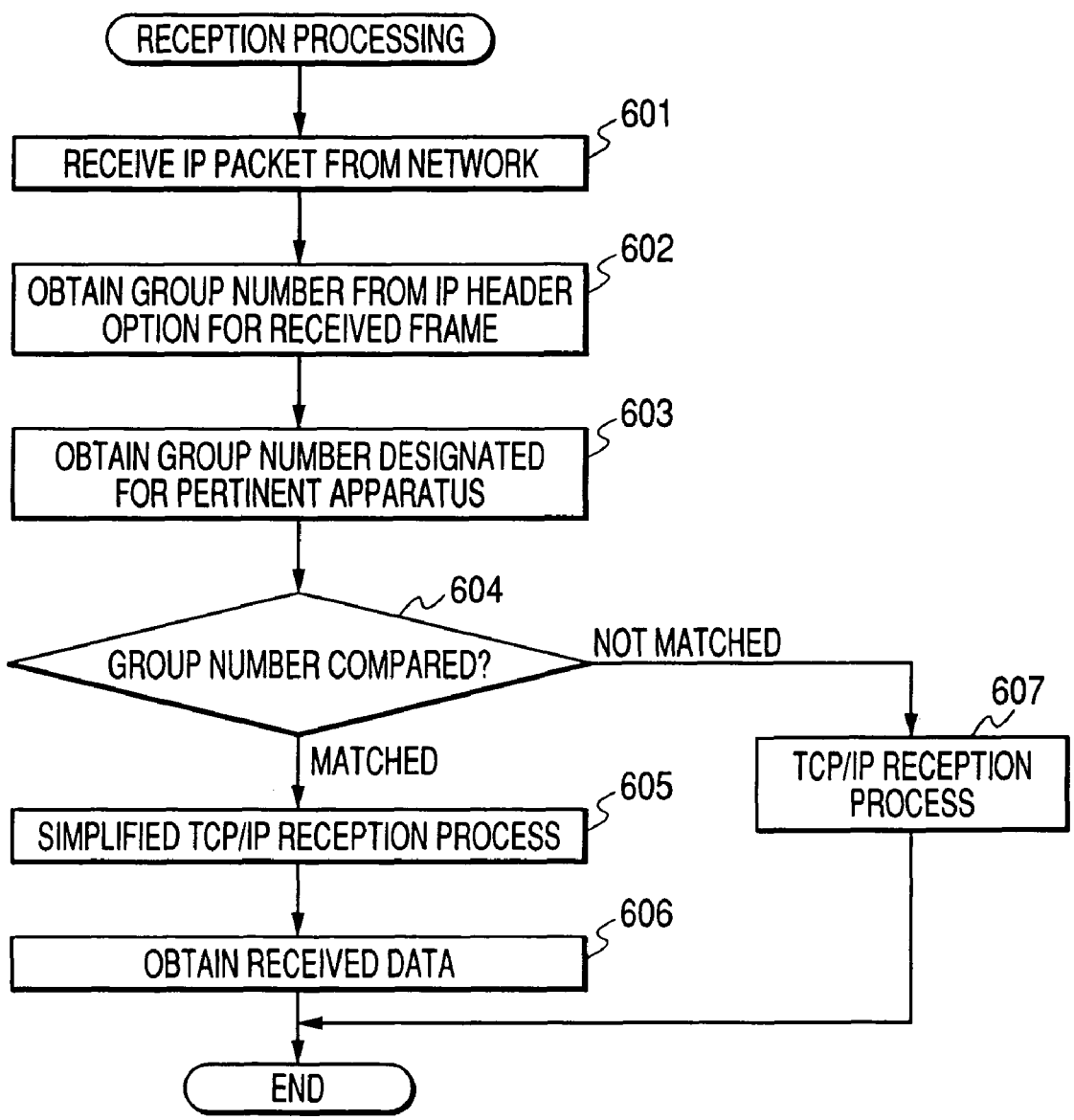
FIG. 6 is a flowchart showing the reception processing for a second embodiment of the invention.

FIG. 6 is a flowchart showing the reception processing performed by each communication apparatus in the second embodiment. The reception processing will now be described while referring to FIG. 6. First, a communication apparatus receives an IP packet from a network (step 601). Then, the communication apparatus examines the IP header option for the received IP packet, and obtains a group number that is stored following the option end position indicator value "0x00" (step 602).

The communication apparatus obtains its own group number in accordance with the setup value of the communication apparatus that is stored in an external memory or in the internal memory (step 603). Following this, the communication apparatus compares the two group numbers, and when the two group numbers match, performs a minimum check process that is a simplified normal TCP/IP reception process (step 605), and obtains the received data (step 606). The reception processing is thereafter terminated. An example minimum check process can be a checksum process for the IP layer or higher, or a process for rejecting a fragmented packet. Whereas when the two group numbers do not match, the communication apparatus performs the normal TCP/IP reception process (step 607), and obtains the received data (step 606). The reception processing is thereafter terminated.

With this arrangement, the communication performance only for communication apparatuses belonging to the same group can be improved. This is effective when one group is constituted by communication apparatuses that can be trusted with each other. So long as the transmission and reception of a packet are performed in the same group, it can be assumed that an unauthorized access, such as the alteration of data, does not occur, or that a packet including an unintended parameter will not be received, and the checking process for the received data can be eliminated.

Figure 7:
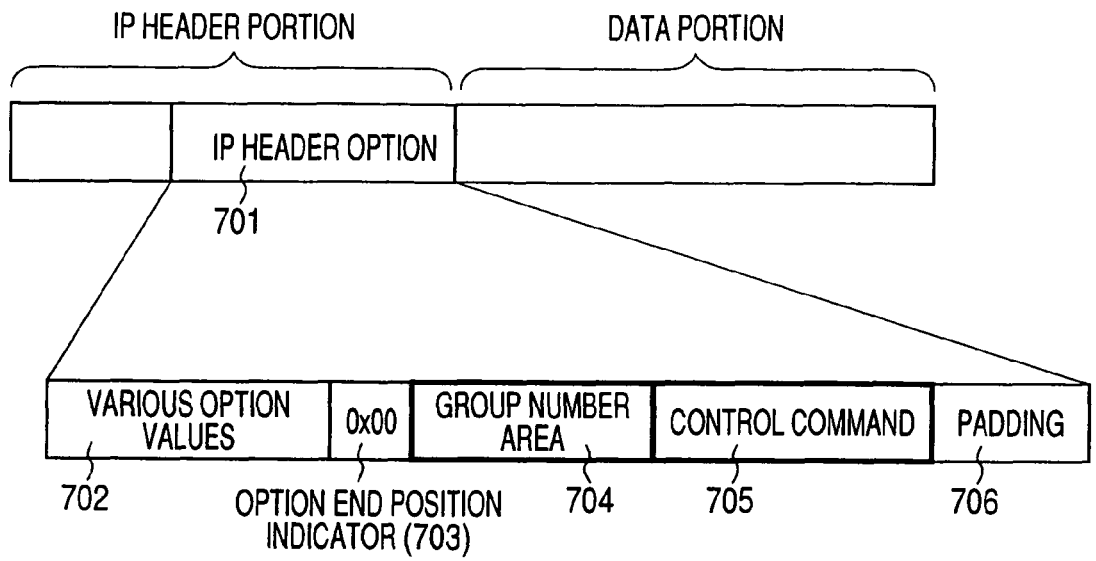
FIG. 7 is a diagram showing the format used for an IP packet according to a third embodiment of the invention.

FIG. 7 is a diagram showing the format of an IP packet used for transmission and reception performed in accordance with a third embodiment of the present invention, and the IP packet includes an area 705 for storing a control command 705. A value to be stored as a control command must be defined, and as an example method, an ASCII character string, such as "reset", is stored and the end of the command is represented by "0x00" (hereinafter referred to as ¥0 terminal) In this case, a value actually stored in the control command area 705 is "0x726573657400". An IP header option 701, various option values 702, an option end position indication 703, a group number area 704 and padding 706 are the same as those for the first embodiment.

Figure 8:
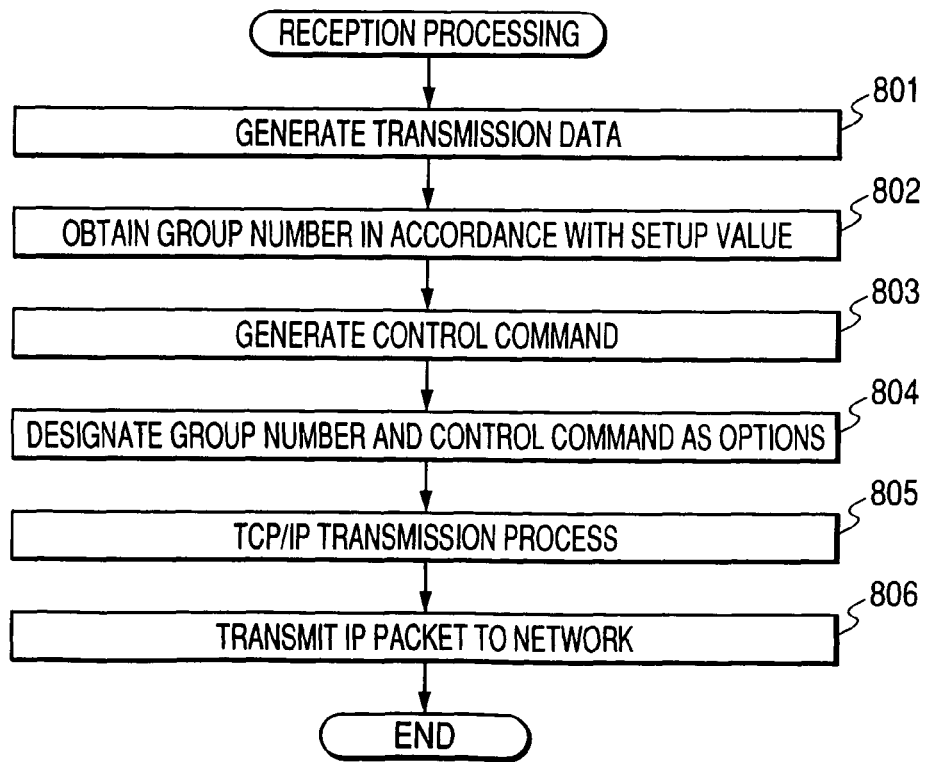
FIG. 8 is a flowchart showing the transmission processing for the third embodiment.

FIG. 8 is a flowchart showing the transmission processing performed by each communication apparatus in accordance with the third embodiment. First, a communication apparatus generates data to be transmitted to a network (step 801). Then, the communication apparatus obtains its own group number in accordance with the setup value for the communication apparatus that has been stored in advance in an external memory or in the internal memory (step 802).

Sequentially, the communication apparatus generates a control command to permit the designation of a communication destination to perform a desired process (step 803). Following this, the communication apparatus designates the group number that is to be stored, in the IP header option, following the option end position indicator value "0x00", and designates the control command generated at step 803 that is to be stored following the group number (step 804). Then, the communication apparatus performs the TCP/IP transmission process to generate an IP packet as a network packet (step 805), and transmits the IP packet to the network (step 806). The transmission processing is thereafter terminated.

Figure 9:
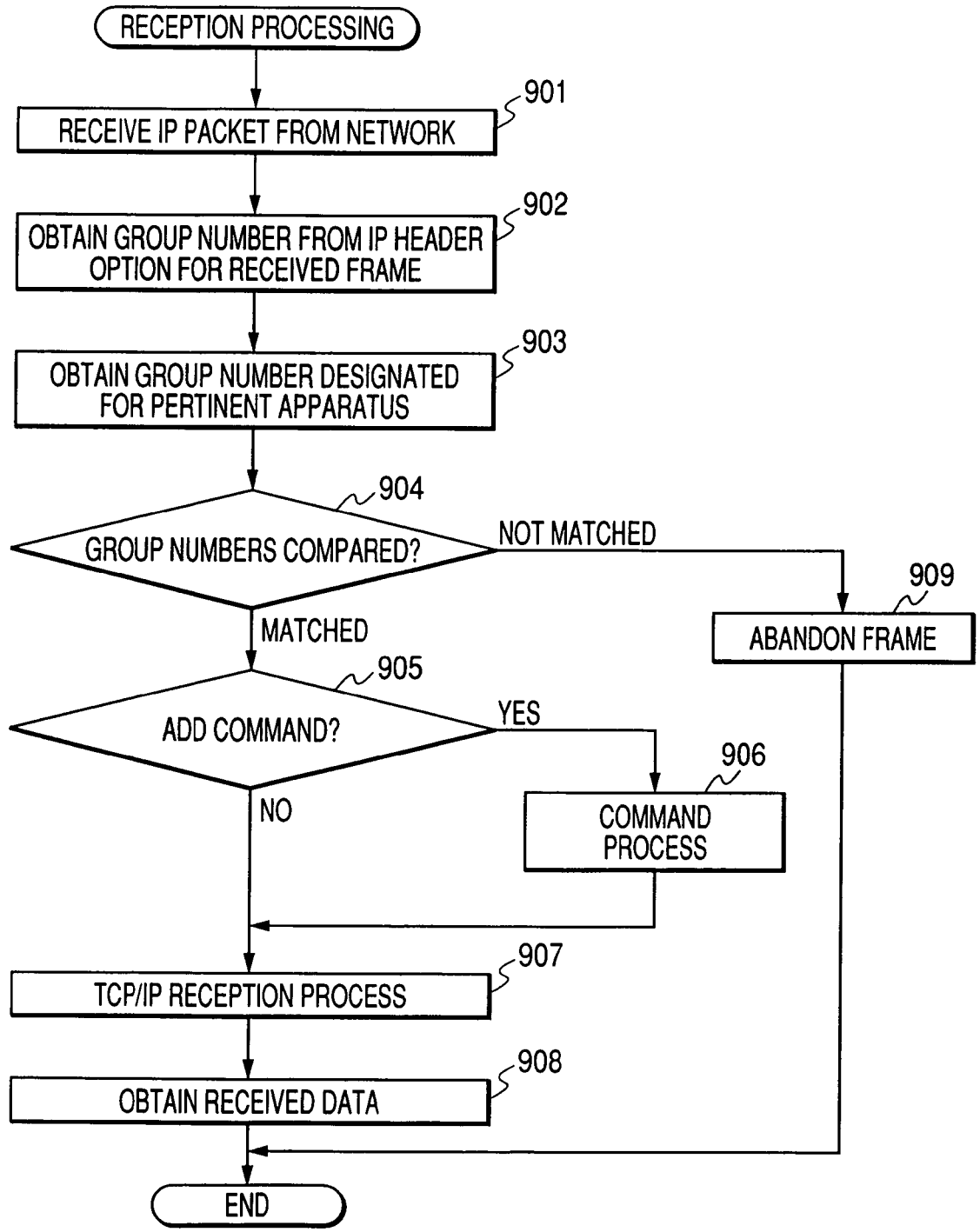
FIG. 9 is a flowchart showing the reception processing for the third embodiment.

FIG. 9 is a flowchart showing the reception processing performed by each communication apparatus in accordance with a third embodiment of the present invention. The reception processing will now be described while referring to FIG. 9. First, a communication apparatus receives an IP packet from a network (step 901). Then, the communication apparatus examines the IP header option of the received packet, and obtains a group number that is stored following the option end position indicator value "0x00" (step 902).

The communication apparatus obtains its own group number in accordance with the setup value of the communication apparatus that has been stored in advance in an external memory or the internal memory (step 903). Then, the communication apparatus compares the two group numbers, and when the two group numbers do not match, abandons the received frame (step 909). The reception processing is thereafter terminated. Whereas when the two group numbers match, the communication apparatus determines whether there is a character string ending with the ¥0 terminal to determine whether a control command is additionally provided following the group number (step 905). When the control command is present, the communication apparatus performs a command process (step 906), performs the TCP/IP reception process (step 907), and obtains the data that has been received (step 908). The reception processing is thereafter terminated.

With this arrangement, only the communication apparatuses in the same group can perform network communication, and can perform a special control command. The control command can be an apparatus reset command, a setup change command or a group number change command.

Figure 10:
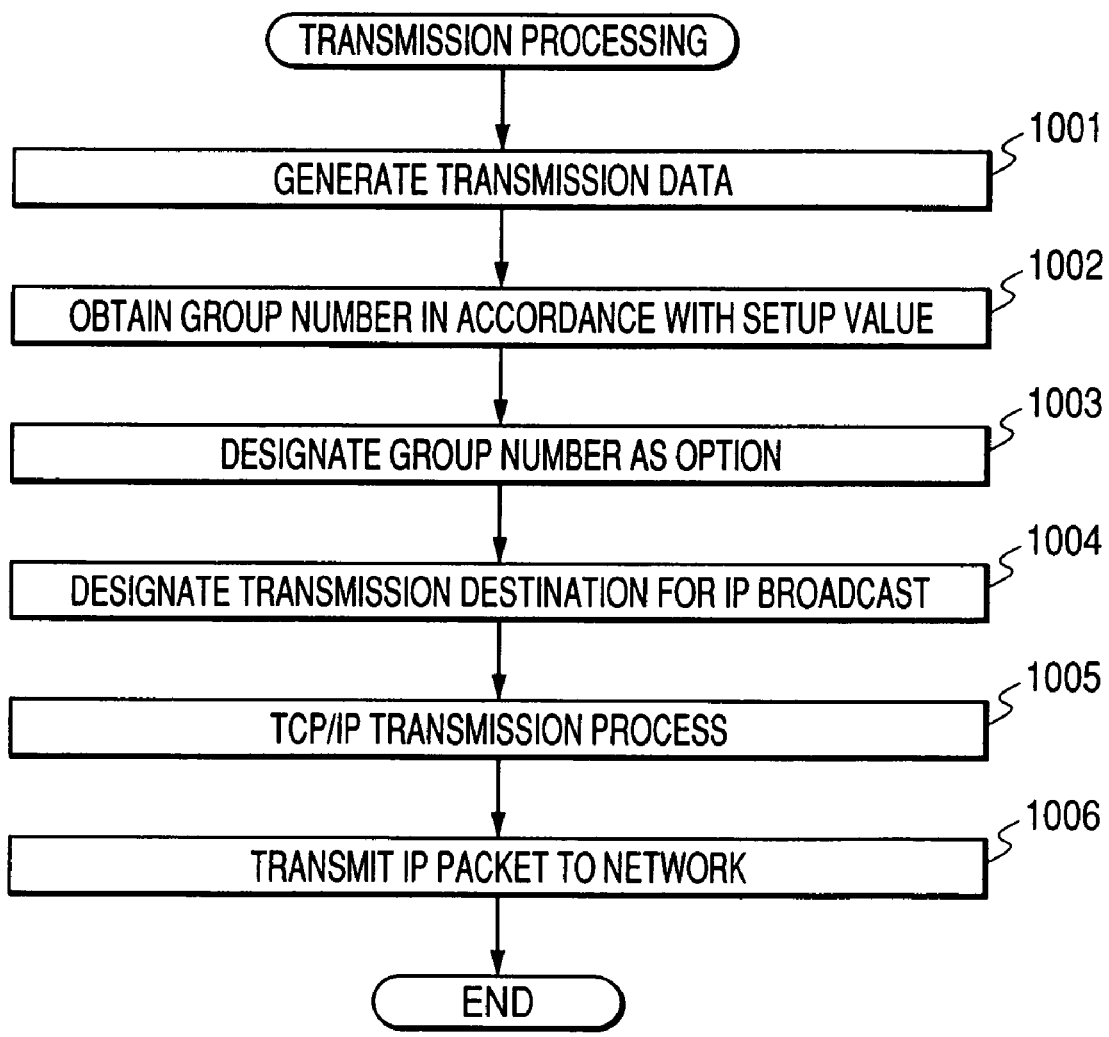
FIG. 10 is a flowchart showing the transmission processing for a fourth embodiment of the invention.

FIG. 10 is a flowchart showing the transmission processing performed by each communication apparatus in accordance with a fourth embodiment of the present invention.

The transmission processing will now be described while referring to FIG. 10. First, a communication apparatus generates data to be transmitted to a network (step 1001). Then, the communication apparatus obtains its own group number in accordance with the setup value of the communication apparatus that has been stored in advance in an external memory or in the internal memory (step 1002).

The communication apparatus designates the group number to be stored following the option end position indicator value "0x00" in the IP header option (step 1003), and designates a transmission destination for the IP broadcast (step 1004) Then, the communication apparatus performs the TCP/IP transmission process to generate an IP packet as a network packet (step 1005), and transmits the IP packet to the network (step 1006). The transmission processing is thereafter terminated. The reception processing is performed in the same manner as in the first embodiment.

With this arrangement, only one packet need be transmitted to all the communication apparatuses in the same group, so that communication with these apparatuses is enabled.

Figure 11:
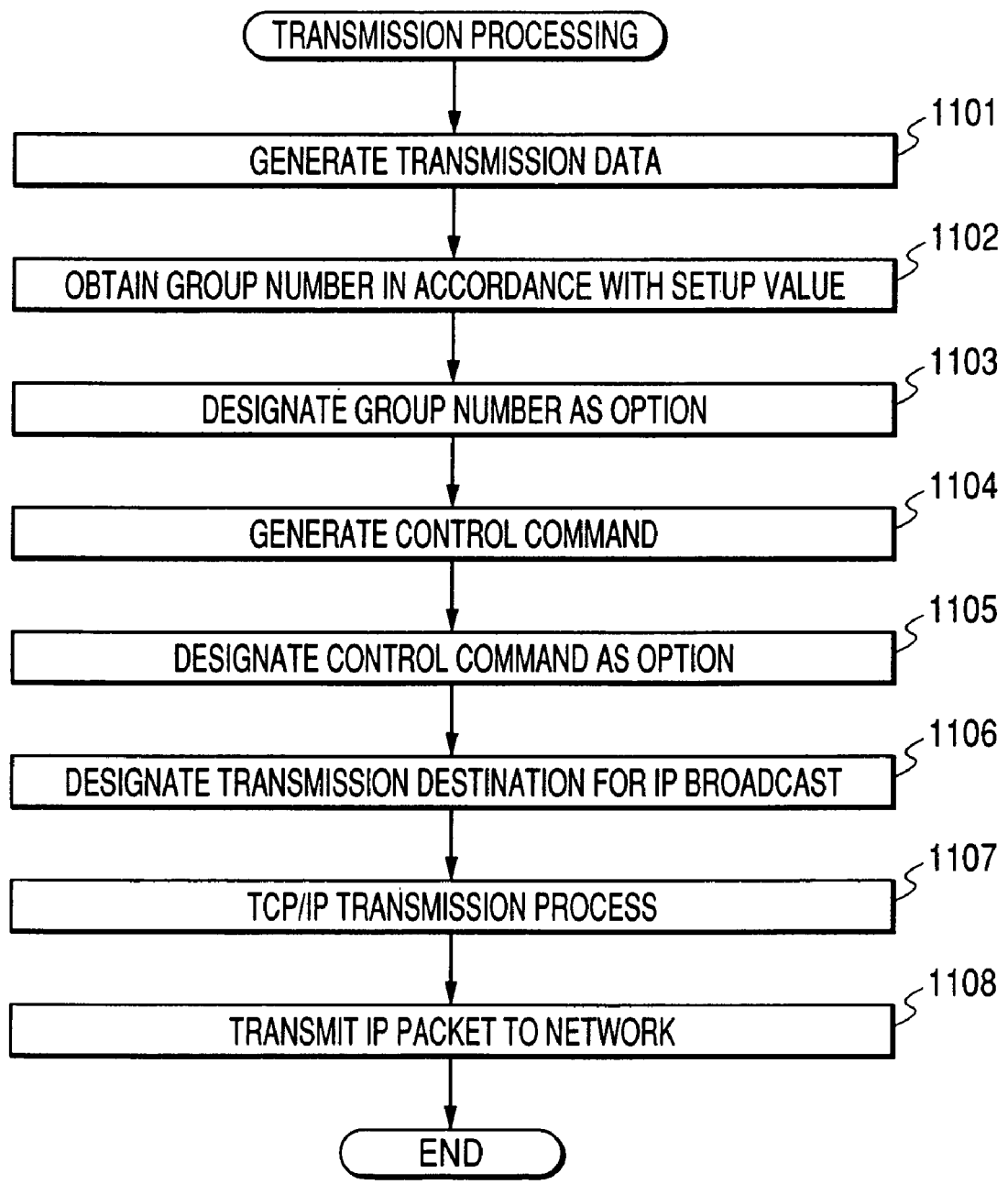
FIG. 11 is a flowchart showing the transmission processing for a fifth embodiment of the invention.

FIG. 11 is a flowchart showing the transmission processing performed by each communication apparatus according to a fifth embodiment of the present invention.

The transmission processing will now be explained while referring to FIG. 11. First, a communication apparatus generates data to be transmitted to a network (step 1101). Then, the communication apparatus obtains its own group number in accordance with the setup value of the communication apparatus that has been stored in advance in an external memory or in the internal memory (step 1102).

Sequentially, the communication apparatus designates the group number to be stored following the option end position indicator value "0x00" in the IP header option (step 1103), and generates a control command to permit a communication destination to perform a desired process (step 1104). Then, the communication apparatus designates the group number to be stored following the option end position indicator value "0x00" in the IP header option, and also designates the control command generated at step 1104 to be stored following the group number (step 1105).

Following this, the communication apparatus designates a transmission destination for an IP broadcast (step 1106), performs the TCP/IP process to generate an IP packet as a network IP packet (step 1107), and transmits the IP packet to the network (step 1108). The transmission processing is thereafter terminated. The reception processing is performed in the same manner as in the third embodiment.

With this arrangement, only one packet need be transmitted to all the communication apparatuses in the same group, so that the communication apparatuses can communicate with each other and perform a control command. For example, when an apparatus reset command or a group number change command is designated, the resetting of the communication apparatuses in a specific group or the changing of the group numbers can be performed.

Figure 12:
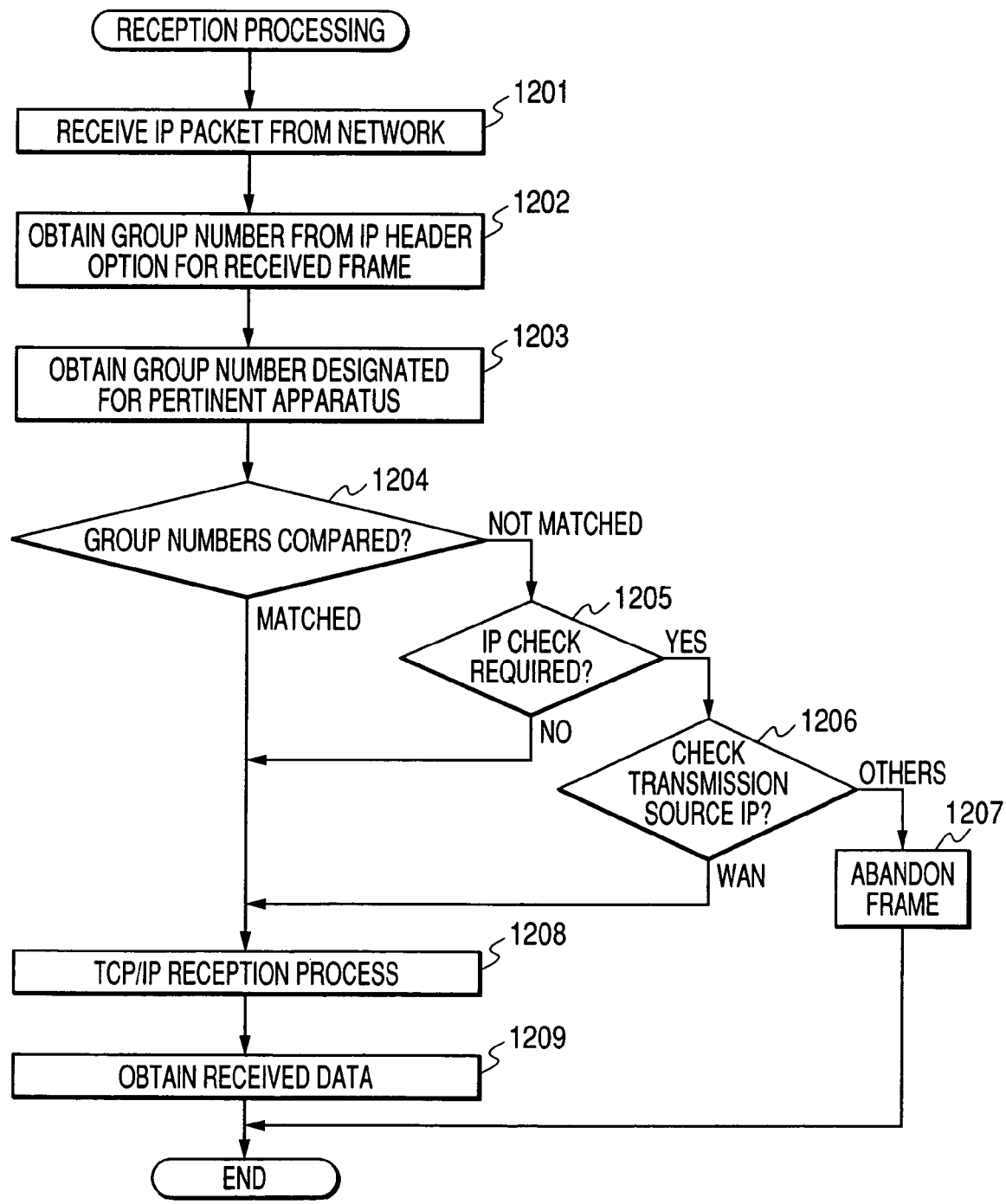
FIG. 12 is a flowchart showing the reception processing for a sixth embodiment of the invention.

FIG. 12 is a flowchart showing the reception processing performed by each communication apparatus according to a sixth embodiment of the present invention. The reception processing will now be explained while referring to FIG. 12. First, a communication apparatus receives an IP packet from a network (step 1201). Then, the communication apparatus examines the IP header option of the received packet, and obtains a group number that is stored following the option end position indicator value "0x00" (step 1202).

The communication apparatus obtains its own group number in accordance with the setup value of the communication apparatus that has been stored in advance in an external memory or in the internal memory (step 1203). Sequentially, the communication apparatus compares the two group numbers (step 1204), and when the two group numbers match, assumes that the transmission source is a communication apparatus in the same group, performs the normal TCP/IP reception process (step 1208), and obtains the data that has been received (step 1209). The reception processing is thereafter terminated.

When the two group numbers do not match, the communication apparatus determines whether the IP check process should be performed (step 1205). For this determination, a value that, based on the setup value stored in the external memory or in the internal memory, can be changed is employed, and the requirement or the non-requirement of the IP check can be designated in advance as the setup value for the communication apparatus in the external memory or in the internal memory.

When the non-requirement for the IP check has been designated, the communication apparatus performs the normal TCP/IP reception process (step 1208) and obtains the data that has been received (step 1209). The reception processing is thereafter terminated. When a requirement for the IP check has been designated, the communication apparatus examines the transmission IP address that is stored in the IP header of the received frame, and compares, with the network portion of the IP address of the communication apparatus, the AND value for the transmission IP address and the sub-net mask value stored in the communication apparatus. When the two values do not match, the communication apparatus determines that the IP packet has been received from a WAN network.

Since data reception from the WAN network is not included for the group control, the communication apparatus performs the normal TCP/IP reception process (step 1208), and obtains the data that has been received (step 1209). The reception processing is there after terminated. Where as when the IP packet is not from the WAN network, the communication apparatus abandons the IP packet from the received frame (step 1207), and terminates the reception processing. The transmission processing is performed in the same manner as in the first embodiment.

With this arrangement, not only the group control process but also communication via the Internet can be performed normally. When communication via the Internet is not desired, a designation that the IP check is not required must merely be entered in the external memory, or in the internal memory, for reception from the WAN network not to be performed. Thus, for a single closed group, a completely secure network can be constructed on the LAN. Since the system is operated while a requirement for the IP check is designated, as needed, is operated while non-requirement of the IP check is designated, this method is an effective means for temporarily inhibiting access via the Internet.

Figure 13:
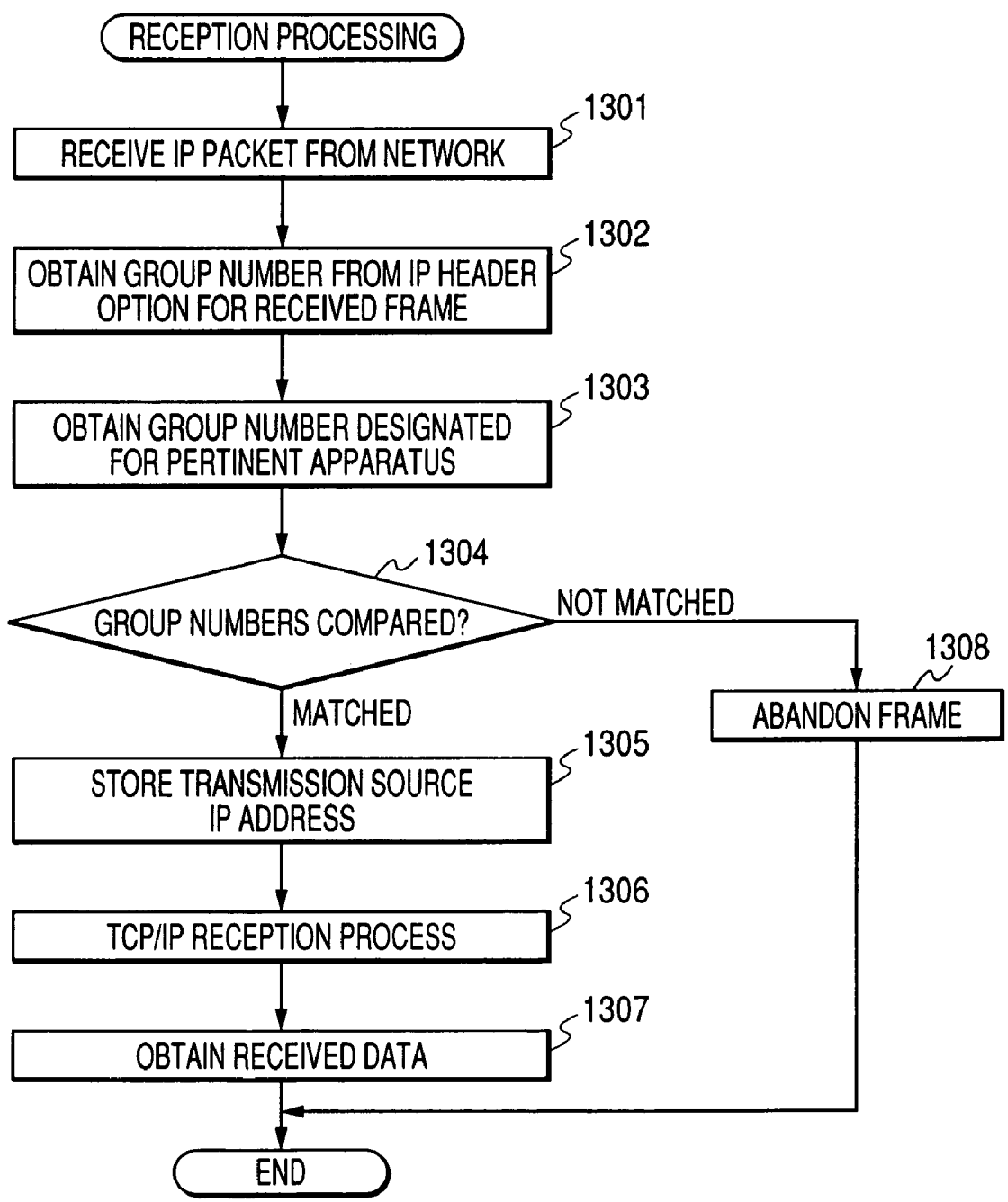
FIG. 13 is a flowchart showing the reception processing for a seventh embodiment of the invention.

FIG. 13 is a flowchart showing the reception processing performed by each communication apparatus according to a seventh embodiment of the present invention.

The reception processing will now be explained while referring to FIG. 13. First, a communication apparatus receives an IP packet from a network (step 1301). Then, the communication apparatus examines the IP header option of the received IP packet and obtains a group number that is stored following the option end position indicator value "0x00" (step 1302).

The communication apparatus obtains its own group number in accordance with the setup value for the communication apparatus that has been stored in advance in an external memory or in the internal memory (step 1303). Then, the communication apparatus compares the two group numbers, and when the two group numbers match, examines the transmission IP address included in the received IP packet and stores the obtained IP address as the IP address for a communication apparatus that belongs to the same group on the network (step 1305).

Since the IP packet has been transmitted from a communication apparatus in the same group, the communication apparatus performs the normal TCP/IP reception process (step 1306) and obtains the data that has been received (step 1307). The reception processing is thereafter terminated. Whereas when the two group numbers do not match, the communication apparatus abandons the received frame (step 1308) and terminates the reception processing. The transmission processing is performed in the same manner as in the third embodiment.

With this arrangement, a communication apparatus can hold the IP address of another communication apparatus, in the same group, with which communication was previously performed. For example, when a command to change a group number to a different number is designated a control command, a communication apparatus transmits this command to a different apparatus, in the same group, with which communication was previously performed, and in accordance with the command, the different apparatus is moved to another group. As a result, a temporary, virtual private group can be formed. Furthermore, in order to cope with a case wherein a communication apparatus that holds the IP address information is not present on the network, e.g., has shut down, the information thus stored need only be deleted after a specific period of time has elapsed.

FIG. 14 is a flowchart showing the group number notification processing performed by each communication apparatus according to an eighth embodiment of the present invention. The group number notification processing will now be described while referring to FIG. 14. First, a communication apparatus generates empty data to be transmitted in order to notify a network of a group number (step 1401). Then, the communication apparatus obtains its own group number in accordance with a setup value that has been stored in advance for it in an external memory or in the internal memory (step 1402).

The communication apparatus designates the group number to be stored following the option end position indicator value "0x00" in the IP header option (step 1403). Sequentially, then, the communication apparatus designates a transmission destination for an IP broadcast (step 1404) and performs the TCP/IP transmission process to generate an IP packet as a network packet (step 1405). Thereafter, the communication apparatus transmits the IP packet to the network (step 1406), waits for a specific period of time for a retransmission (step 1407), and returns to the process at step 1401.

The method of the eighth embodiment is an effective means in an environment wherein the method of the seventh embodiment is provided. The group information can be obtained only through the processing performed in the seventh embodiment; however, with the processing performed in the eighth embodiment, a real-time property for the sharing of the group information can be improved. Thus, when the processing in the eighth embodiment is initiated immediately after the communication apparatus has been activated, a group number of its own can immediately be transmitted to all other communication apparatuses in the same group. Further, since the retransmission of the group number is performed, notification of the group number can be provided for a communication apparatus that is connected later.

With this arrangement, a communication apparatus can obtain the IP addresses of all other communication apparatuses in the same group on the network, and can store the IP addresses as log information, for example. And when a display device is provided for the communication apparatus, group information can be automatically obtained without having to confirm the setups of all the communication apparatuses. Since the transmission process is repeated during the processing performed for the eighth embodiment, a load may be imposed on the network, and it is preferable that a retransmission waiting time having an appropriate length be designated (e.g., an interval for which the measurement units are seconds, such as every sixty seconds).

According to this invention, since each communication apparatus can identify a group number and can perform both a transmission process and a reception process, a system can be provided whereby, for a LAN network, apparatuses can be separated into groups without a VLAN switch being employed. Since the communication apparatuses individually identify their group numbers during operation, unlike a system for which the VLAN switch is used, changes in the setup related to the entire network and changes in the wiring are not required, and only the setting up of the group number for a target communication apparatus need be changed. Further, by employing a function for accepting only communication accesses initiated by apparatuses in the same group and a function for broadcasting across a network only IP packets that carry the group number, the transmission of data can be limited to the communication apparatuses belonging to the same group. This method is very effective when images must be broadcast only to the same group, and can, for example, be employed to broadcast in real time images obtained by a network camera. Furthermore, by employing a function that provides an additional control command in a packet, a communication apparatus can be operated that is designated using remote control. And when IP broadcasting is employed to distribute such a control command to an entire group, the convenience provided by the network can be improved. For example, when the components of a home network environment consist of a home appliance group and an AV apparatus group, and a power OFF control command is transmitted to the AV apparatus group, only the collective apparatuses in the AV apparatus group are powered off, while the power supply is maintained for the home appliance group, including, for example, a refrigerator that is not to be powered off. In addition, by employing a function for holding the group information for a communication packet, the communication apparatuses in the same group on a network can be identified and managed. Moreover, by employing a function for notifying a network which group a communication apparatus belongs to when activated, the group information can be updated immediately. Generally, for a home network, an IP address is automatically allocated in the DHCP environment. In an environment wherein an IP address must be changed each time an automatic allocation occurs, the VLAN switch can not cope with network grouping, while in accordance with the invention, network grouping in the DHCP environment can also be performed. Therefore, for a conventional home network environment, a greater effect can be obtained by using network grouping than can be obtained by using a VLAN switch, and a network control function can also be provided. Thus, when the system of the present invention is mounted for use with home/AV network apparatuses, the described effects can readily be obtained.

What is claimed is:

1. A communication method for receiving an IP packet that includes an IP header and an IP data portion, the IP header including an address portion and an option area, the option area including an end position indicator indicating an end position of the option area, the method comprising the steps of:
receiving the IP packet from a network by an individual terminal, the IP packet further including an additional data provided in an additional data area defined in the IP packet header following the end position indicator; and
reading the additional data in the option area, wherein:
the additional data is a group number used to define a plurality of communication partners to be combined, and
the method further comprises the steps of:
comparing a reference group number designated for the individual terminal with the group number used to define a plurality of communication partners to be combined in the additional data area; and
determining whether performing TCP/IP reception process or abandoning the IP packet, in accordance with the comparison results.

2. The communication method according to claim 1, wherein
the IP packet is abandoned when the group number and the reference group number do not match in the comparing step.

3. The communication method according to claim 1, wherein
a TCP/IP processing form is changed in accordance with the comparison results.

4. A communication method for receiving an IP packet that includes an IP header and an IP data portion, the IP header including an address portion and an option area, the option area including an end position indicator indicating an end position of the option area, the method comprising the steps of:
receiving the IP packet from a network by an individual terminal, the IP packet further including an additional data provided in an additional data area defined in the IP packet header following the end position indicator; and
reading the additional data in the option area, wherein:
the additional data is a group number used to define a plurality of communication partners to be combined, and
the method further comprises:
obtaining the group number from the additional data area; and
performing a process in accordance with a control command for notifying the communication partners defined by the group number.

5. A communication method for receiving an IP packet that includes an IP header and an IP data portion, the IP header including an address portion and an option area, the option area including an end position indicator indicating an end position of the option area, the method comprising the steps of:
receiving the IP packet from a network by an individual terminal, the IP packet further including an additional data provided in an additional data area defined in the IP packet header following the end position indicator; and
reading the additional data in the option area, wherein:
the additional data is a group number used to define a plurality of communication partners to be combined,
the method further comprises obtaining the group number from the additional data area, and
a process based on a control command is performed when a reference group number designated for the individual terminal and the group number used to define a plurality of communication partners to be combined in the additional data area do not match.

6. A communication method for receiving an IP packet that includes an IP header and an IP data portion, the IP header including an address portion and an option area, the option area including an end position indicator indicating an end position of the option area, the method comprising the steps of:

receiving the IP packet from a network by an individual terminal, the IP packet further including an additional data provided in an additional data area defined in the IP packet header following the end position indicator; and reading the additional data in the option area, wherein the IP packet is abandoned when a network address obtained based on an IP address of a transmission source transmitting the IP packet and a network address designated for the individual terminal do not match.

7. A communication method for receiving an IP packet that includes an IP header and an IP data portion the IP header including an address portion and an option area the option area including an end position indicator indicating an end position of the option area, the method comprising the steps of:

receiving the IP packet from a network by an individual terminal, the IP packet further including an additional data provided in an additional data area defined in the IP packet header following the end position indicator; and reading the additional data in the option area, wherein:

the additional data is a group number used to define a plurality of communication partners to be combined, the method further comprises obtaining the group number from the additional data area, and an IP address for a transmission source transmitting the IP packet is held when a reference group number designated for the individual terminal and the group number used to define a plurality of communication partners to be combined in the additional data area match.

\* \* \* \* \*